US009128699B2

(12) United States Patent
Royer et al.

(10) Patent No.: US 9,128,699 B2
(45) Date of Patent: Sep. 8, 2015

(54) METHOD AND SYSTEM FOR QUEUING TRANSFERS OF MULTIPLE NON-CONTIGUOUS ADDRESS RANGES WITH A SINGLE COMMAND

(75) Inventors: Robert Royer, Portland, OR (US); Amber Huffman, Banks, OR (US)

(73) Assignee: Intel Corporation, Santa Clara, CA (US)

(*) Notice: Subject to any disclaimer, the term of this patent is extended or adjusted under 35 U.S.C. 154(b) by 838 days.

(21) Appl. No.: 12/342,065

(22) Filed: Dec. 22, 2008

(65) Prior Publication Data

US 2010/0161936 A1 Jun. 24, 2010

(51) Int. Cl.
G06F 12/06 (2006.01)
G06F 9/30 (2006.01)
G06F 3/06 (2006.01)
G06F 13/28 (2006.01)

(52) U.S. Cl.
CPC ............ *G06F 9/30043* (2013.01); *G06F 3/061* (2013.01); *G06F 3/0659* (2013.01); *G06F 3/0671* (2013.01); *G06F 13/28* (2013.01)

(58) Field of Classification Search
CPC ....... G06F 13/28; G06F 3/061; G06F 3/0659; G06F 3/0671; G06F 9/30043
USPC ......................................................... 711/154
See application file for complete search history.

(56) References Cited

U.S. PATENT DOCUMENTS 4,346,439 A * 8/1982 Huno et al. ..................... 710/22
6,029,226 A 2/2000 Ellis et al.
6,973,484 B1 * 12/2005 Singhal et al. ................. 709/216
7,512,722 B2 * 3/2009 King et al. ....................... 710/24
2004/0128408 A1 * 7/2004 Bennett ............................ 710/22

(Continued)

FOREIGN PATENT DOCUMENTS

JP 55-097630 7/1980
JP 05-025462 2/1993

(Continued)

OTHER PUBLICATIONS

Samsung Introduces the Next Generation of Nonvolatile Memory—PRAM, Sep. 2006.*

(Continued)

*Primary Examiner* — Cheng-Yuan Tseng
*Assistant Examiner* — Ramon A Mercado
(74) *Attorney, Agent, or Firm* — Grossman, Tucker, Perreault & Pfleger, PLLC

(57) ABSTRACT

Methods and systems for queuing transfers of multiple non-contiguous address ranges within a single command are disclosed. Embodiments of systems include system processors, memory to store data and executable software, and storage devices to receive transfer commands stored in system memory. A host controller interface driver is executed by one or more system processors and collects multiple non-continuous address ranges from storage-device transfer requests and records starting addresses and quantities of data to transfer for each non-continuous range in a tagged command list. It records the number of address ranges in the tagged command list, and a tagged-transfer opcode in a command, and stores the command and the tagged command list in a command table for the storage device. It records a base address for the command table in memory and an offset for the tagged command list into a command header, which is stored in a command queue.

17 Claims, 9 Drawing Sheets

(56) References Cited

U.S. PATENT DOCUMENTS

| | | | |
|---|---|---|---|
| 2005/0066120 | A1 | 3/2005 | Ohta et al. |
| 2005/0193164 | A1 | 9/2005 | Royer, Jr. et al. |
| 2005/0215008 | A1 | 9/2005 | Orlowski et al. |
| 2006/0149861 | A1 | 7/2006 | Yamazaki et al. |
| 2006/0288160 | A1 | 12/2006 | Krantz et al. |
| 2007/0005896 | A1 | 1/2007 | Chang et al. |
| 2007/0150657 | A1 | 6/2007 | Yigzaw et al. |
| 2007/0162649 | A1* | 7/2007 | Wang et al. ............ 710/22 |
| 2008/0028108 | A1* | 1/2008 | Sawai et al. ............ 710/22 |
| 2009/0150894 | A1* | 6/2009 | Huang et al. ............ 718/104 |

FOREIGN PATENT DOCUMENTS

| | | |
|---|---|---|
| JP | 10296636 | 11/1998 |
| JP | 10310840 | 11/1998 |
| JP | 11-338644 | 12/1999 |
| JP | 2000-242601 | 9/2000 |
| JP | 2001-154811 | 6/2001 |
| JP | 2006190301 | 7/2006 |
| JP | 2006-294002 | 10/2006 |
| JP | 2006-294022 | 10/2006 |
| JP | 2006-338371 | 12/2006 |
| JP | 20020269560 | 2/2008 |
| JP | 2008-117195 | 5/2008 |
| JP | 2008-140142 | 6/2008 |
| KR | 10-2008-0071189 | 8/2008 |
| WO | 02/17305 | 2/2002 |
| WO | 2005093588 | 10/2005 |
| WO | 2010/074944 | 7/2010 |
| WO | 2010074944 | 7/2010 |

OTHER PUBLICATIONS

Serial ATA, Wikipedia, Nov. 28, 2008.*

International Search Report and Written Opinion dated Jul. 16, 2010 issued in related International Patent Application No. PCT/US2009/067031.

International Preliminary Report on Patentability received for International Patent Application No. PCT/US2009/067031, mailed on Jul. 7, 2011, 6 pages.

Office Action Received for European Application No. 09835500.1, mailed on May 22, 2012, 6 Pages.

Search Report Received for the European Application No. 09835500.1, mailed on Apr. 27, 2012, 3 Pages.

Serial ATA Advanced Host Controller Interface (AHCI) 1.3, Ratified on Jun. 26, 2008, 131 pages.

Non-Volatile Memory Host Controller Interface (NVMHCI) 1.0 Apr. 14, 2008, 65 pages.

Serial ATA International Organization: Serial ATA Revision 2.6, Feb. 15, 2007, 600 pages.

Office Action received for Japan Application No. 2011-536629, mailed Aug. 7, 2012, 3 pages.

Kobayashi, Storage, A Provisional for Supporting a Construction of a High-speed Interface, etc.: an IP solution of a platform base, Nikkei micro-device, Jul. 2008, Nikkei Business Publications, Inc., Jul. 1, 2008, No. 277, 6 pages.

Office Action received for Chinese Patent Application No. 200980139230.3, mailed on Aug. 26, 2014, 17 pages of Office Action including 10 pages of English Translation.

Japanese Office Action from related JP2011-536629 mailed Apr. 16, 2013.

Korean Office Action from related Korean Application 2011-7007703 mailed Jul. 19, 2012.

Notice of Allowance from related Korean Application 2011-7007703 mailed Jan. 29, 2013.

China Office Action from related China Application 200980139230.3, mailed on Dec. 5, 2012.

China Office Action from related China Application 200980139230.3 mailed Aug. 8, 2013.

Office Action received for Chinese Patent Application No. 200980139230.3, mailed on Feb. 12, 2014, 10 pages of English Translation and 7 pages of Chinese Office Action.

Office Action received for Japanese Patent Application No. 2011-536629, mailed on Sep. 10, 2013, 3 pages of English Translation and 3 pages of Japanese Office Action.

* cited by examiner

METHOD AND SYSTEM FOR QUEUING TRANSFERS OF MULTIPLE NON-CONTIGUOUS ADDRESS RANGES WITH A SINGLE COMMAND

FIELD OF THE DISCLOSURE

This disclosure relates generally to the field of accessing hard disks and/or non-volatile memory. In particular, the disclosure relates to queuing transfers of multiple non-contiguous address ranges within a single command.

BACKGROUND OF THE DISCLOSURE

In modern computing systems a variety of storage devices may be employed for storing and for accessing software and/or data. Typically these may include magnetic storage devices such as hard disk drives (HDDs), optical storage disks such as compact disks (CDs) and flash-memory solid state drives (SSDs).

In the HDD, information is stored on magnetic platters rotating at a high speed and is read from, and written to the platters by a block of read/write heads. A microcontroller controls the movement of the heads relative to the platters, communicates with an external interface, and works with a disk cache buffer. Data can be stored in different parts of the platters and when the workload is random or nearly random it may take significant amounts of time to move the heads to the necessary location above the platter. Reordering write requests and look-ahead reading can increase performance significantly in HDD systems.

Logical block addressing (LBA) is commonly used to specify the location of blocks of data in a storage device. An LBA can refer either to an address or to a block (i.e. an index) with the first block being LBA=0, the second being LBA=1, and so on. The LBA scheme replaces earlier addressing schemes such as the cylinder-head-sector (CHS) scheme, which exposed physical details of the storage device to the operating system software. Logical blocks may typically be 512 or 1024 bytes (ISO 9660 CDs use 2048-byte blocks). System calls requiring block-level I/O pass LBA definitions to the storage device drivers. For some simple cases, a logical block size may be the same size as the smallest physical sectors that can be read from or written to the storage device.

In SSDs, flash memories based on NAND (or NOR) logic, store data in a few chips governed by a microcontroller. SSDs have a faster read time (i.e. the necessary cell or cells only have to be found and read) but a relatively slower write time (i.e. existing data must be erased from the cell or cells before writing new data into it). There are no spinning disks or read/write heads to worry about so access latency is less of an issue than with HDDs.

In order to facilitate higher performance through reordering of data transfer requests, queuing techniques such as Native Command Queuing (NCQ) have been introduced (e.g. for use in Serial ATA (Advanced Technology Attachment) HDDs) to allow optimization of the order that read and write commands are executed. One advantage of queuing for SSDs is that multiple commands can be delivered to the devices so that they aren't stalled when they complete a set of commands. There are also massively parallel implementations that benefit from having as much data as possible to transfer.

A host controller interface (e.g. an Advanced Host Controller Interface (AHCI) for a Serial ATA (SATA) device, or a Non-Volatile Memory Host Controller Interface (NVMHCI) for a flash memory storage device) is a hardware mechanism that allows software to communicate with devices (such as host bus adapters) through a system memory structure in order to take advantage of techniques such as NCQ.

Many modern operating systems such as Microsoft® Windows®, Berkeley Software Distribution (BSD, sometimes called Berkeley Unix) and Linux® provide support for a host controller interface such as AHCI, but such an interface may only support a limited amount of (i.e. 32) in-flight commands in the command queue and may generate a system interrupt for every completed request. Typically, many of the requests or commands could naturally be satisfied and completed together, and as devices increase in performance, they may have the capacity to consume more commands. SCSI protocols, on the other hand, may permits up to $2^{64}$ commands to be queued but implementations supporting such long queues may be expensive and protocol overhead may be significantly greater than in AHCI.

To date, more efficient methods, structures and systems for servicing larger numbers of storage-device transfer requests have not been fully explored.

BRIEF DESCRIPTION OF THE DRAWINGS

The present invention is illustrated by way of example and not limitation in the figures of the accompanying drawings.

DETAILED DESCRIPTION

Methods and systems for queuing the transfer of multiple non-contiguous address ranges within a single command are disclosed below. In some embodiments, the system may include one or more system processors, system memory to store data and executable software, and a storage device to receive transfer commands stored in the system memory. In some embodiments, when a host controller interface driver (e.g. an Advanced Host Controller Interface (AHCI) for a Serial ATA (Advanced Technology Attachment) device, or a Non-Volatile Memory Host Controller Interface (NVMHCI)

for a NAND flash memory storage device) that is stored in the system memory is executed by one or more of the system processors it may collect multiple non-continuous address ranges from storage-device transfer requests, and record a starting address and a quantity of data to transfer for each non-continuous address range into a tagged command list. It may also record a count of the number of non-contiguous address ranges that are in the tagged command list, and a tagged-transfer opcode in a command, and store the command and the tagged command list in a command table in system memory for the storage device. It may record a base memory address for the command table and an offset for the tagged command list into a command header, which is stored in a command queue in accordance with the particular host controller interface. In some alternative embodiments a tagged-transfer command may be communicated to a storage device according to a physical transport mechanism (e.g. as in SATA commands such as ATAPI (ATA Packet Interface) commands and/or SATA NCQ commands) in a host-to-device register FIS (frame information structure). The tagged-transfer command may indicate the availability of a tagged command list storing multiple non-continuous address ranges, which the storage device may requests as a data FIS (i.e. a data packet or packets).

Thus, queuing transfers of multiple non-contiguous address ranges with a single command may provide for more efficient and cost effective methods, structures and systems for servicing larger numbers of storage-device transfer requests.

In the following description, numerous specific details are set forth. However, it is understood that embodiments of the invention may be practiced without these specific details. In other instances, well-known circuits, structures and techniques have not been shown in detail in order not to obscure the understanding of this description. These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

Figure 1:
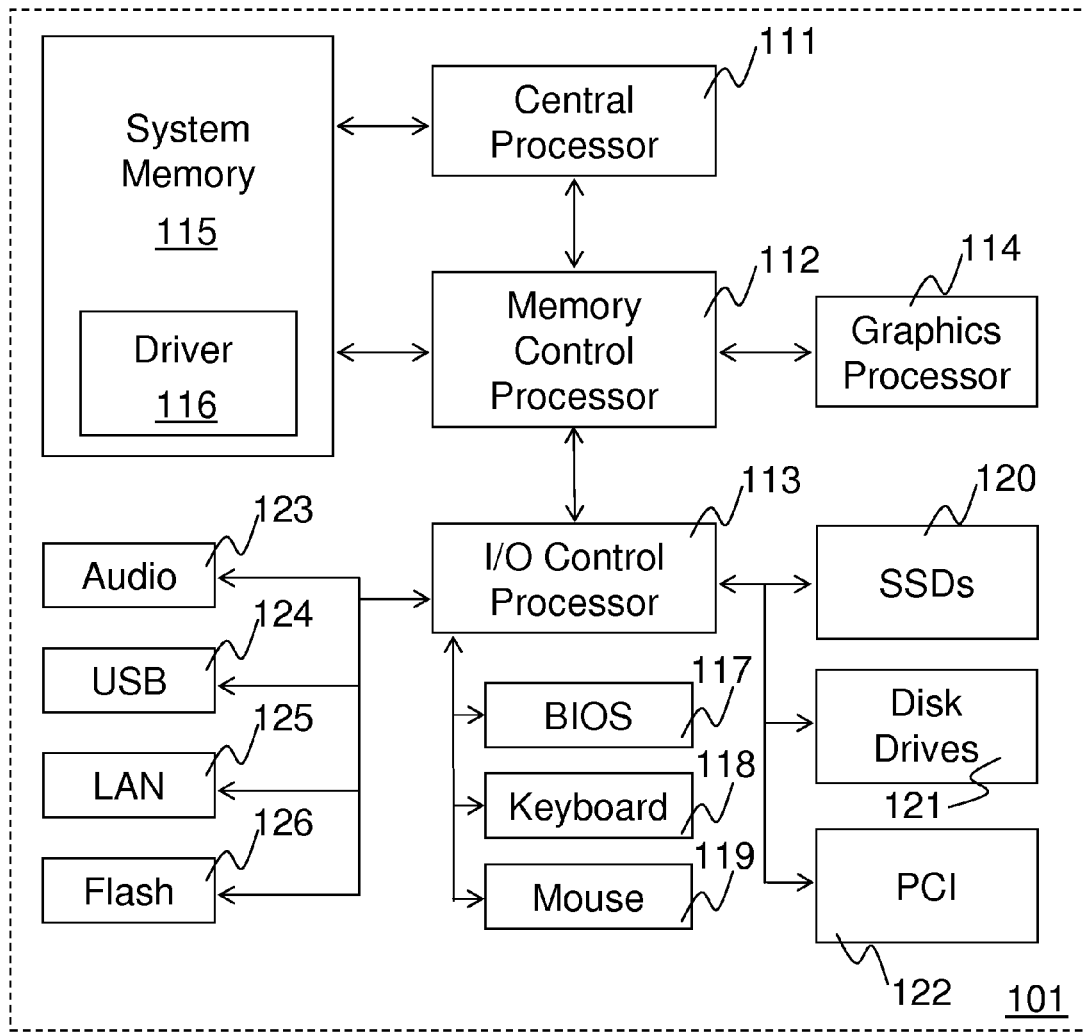
FIG. 1 illustrates one embodiment of a system for requesting a storage device transfer of a plurality of non-contiguous address ranges with a single command.

FIG. 1 illustrates one embodiment of a system 101 for requesting a storage device transfer of a plurality of non-contiguous address ranges with a single command. System 101 includes a number of system processors: central processor 111, memory control processor 112, I/O control processor 113, graphics processor 114 and may also include DMA (direct memory access) processors. In addition system 101 includes certain storage devices, such as SSDs 120, disk drives 121, PCI (Peripheral Component Interconnect) and/or PCI-E (PCI Express) devices 122 and/or flash memory storage 126. System 101 also includes system memory 115 to store data and executable software, as well as audio I/O 123, universal serial bus I/O 124, local area network I/O 125, BIOS 117, keypad interface 118 and mouse interface 119. Storage devices such as SSDs 120, disk drives 121, PCI devices 122, and/or flash memory storage 126 may be coupled with system memory 115 to receive transfer commands stored in system memory 115 for transferring data to and from various address ranges in response to storage-device transfer requests.

System memory 115 also stores a processor executable host controller interface driver 116. In some embodiments of system 101, driver 116 may comprise an AHCI driver for a SATA device (e.g. in SSDs 120 or disk drives 121), and/or a NVMHCI for a NAND flash memory storage device (e.g. flash memory storage 126). When executed by one or more system processors, driver 116 may cause the one or more system processors to collect multiple non-continuous address ranges from corresponding storage-device transfer requests, and record, in a tagged command list, a starting address and a quantity of data to transfer for each of the non-continuous address ranges. The system processors executing driver 116 may also record, in a command, a tagged-transfer opcode and the number of non-contiguous address ranges in the tagged command list, both the command and the tagged command list being stored in a command table in the system memory 115 for the particular storage device. A base address for the command table in system memory 115 and an offset for the tagged command list may be recorded in one of the command headers stored in a command queue for that storage device.

It will be appreciated that system 101 may be used in accordance with the processes herein described for requesting a storage device transfer of multiple non-contiguous address ranges in the tagged command list for each tagged-transfer command.

Figure 2:
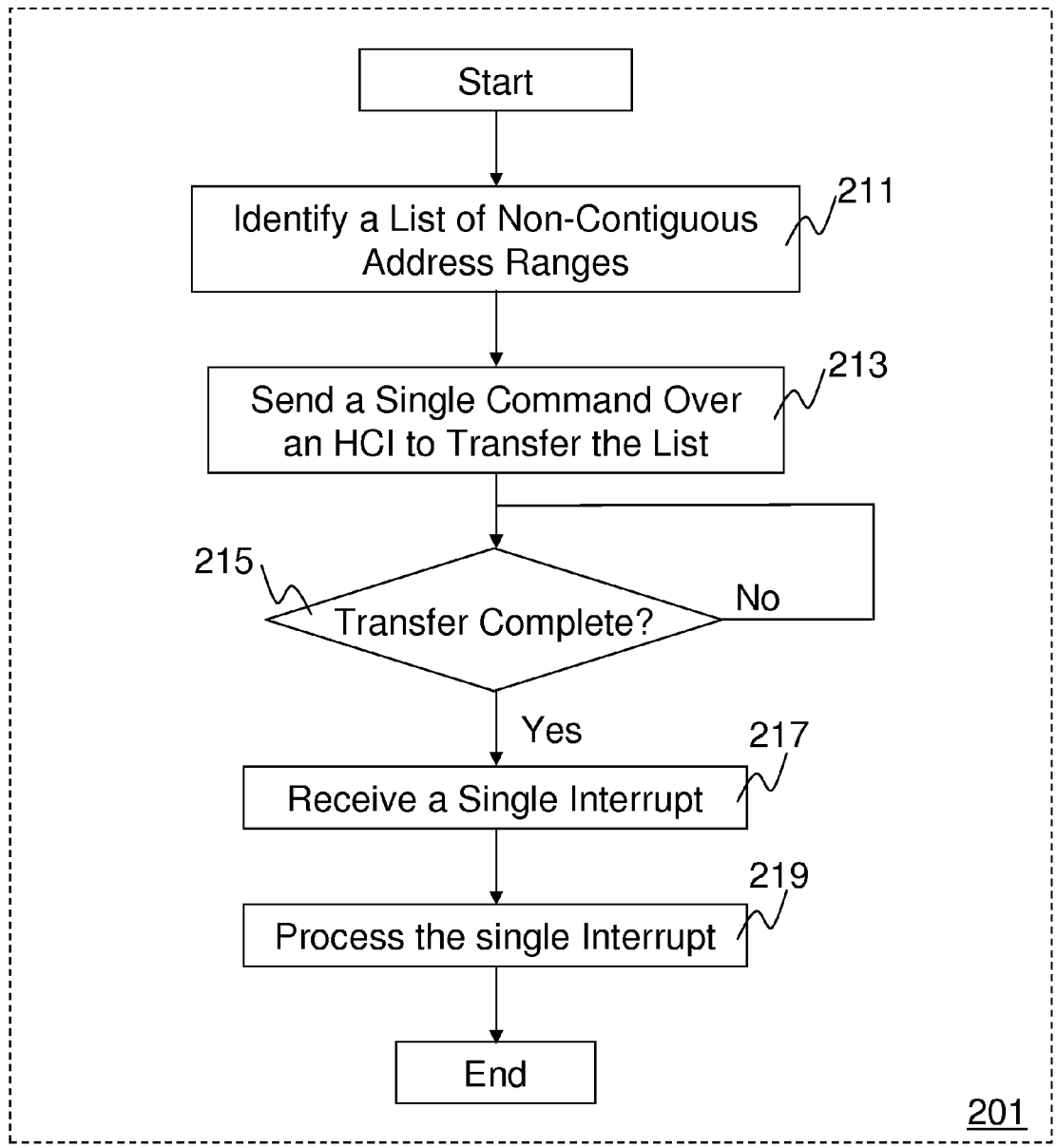
FIG. 2 illustrates a flow diagram for one embodiment of a process to request a storage device transfer of a plurality of non-contiguous address ranges with a single command.

FIG. 2 illustrates a flow diagram for one embodiment of a process 201 to request a storage device transfer of a plurality of non-contiguous address ranges with a single command. Process 201 and other processes herein disclosed are performed by processing blocks that may comprise dedicated hardware or software or firmware operation codes included in machine readable media and executable by general purpose machines or by special purpose machines or by a combination of both.

In processing block 211 a list of multiple non-contiguous address ranges is identified from corresponding storage-device transfer requests. In processing block 213 a single command is sent over a host controller interface to request the storage device to transfer the list of multiple non-continuous address ranges. Some embodiments of process 201 provide for a tagged-transfer command to communicate with a storage device according to a physical transport mechanism (e.g. as in SATA commands such as ATAPI commands and/or SATA NCQ commands) in a host-to-device register FIS. The tagged-transfer command may indicate the availability of a tagged command list storing multiple non-continuous address ranges. The storage device may then request or DMA the tagged command list as a data FIS (i.e. one or more data packets). Next in processing block 215 process 201 waits for the requested data transfers to complete, and upon completion processing proceeds to processing block 217. In processing block 217 a single interrupt is received corresponding to completion of the single command requesting the storage device to transfer the list of multiple non-continuous address ranges. Then in processing block 219 that single interrupt is serviced.

Figure 3:
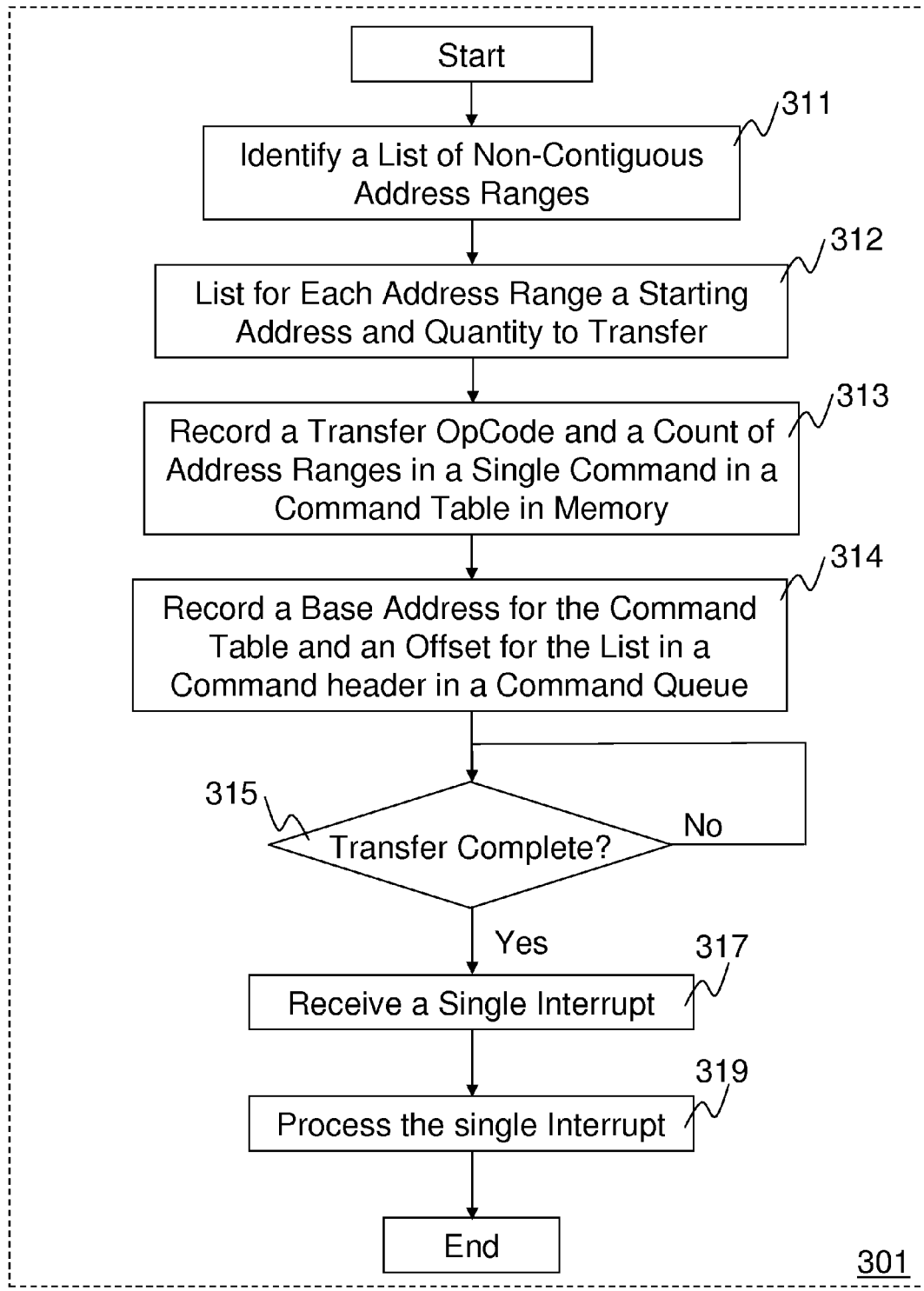
FIG. 3 illustrates a flow diagram for an alternative embodiment of a process to request a storage device transfer of a plurality of non-contiguous address ranges with a single command.

FIG. 3 illustrates a flow diagram for an alternative embodiment of a process 301 to request a storage device transfer of a plurality of non-contiguous address ranges with a single command. In processing block 311 a list of multiple non-contiguous address ranges is identified from corresponding storage-device transfer requests. In processing block 312 for each of the list of identified non-continuous address ranges, a starting address and a quantity of data to transfer is recorded in a tagged command list. In processing block 313 a count of the number of non-contiguous address ranges in the tagged command list, and a tagged-transfer opcode are recorded in a single command, the command being stored in a command table in a memory along with the tagged command list. In processing block 314 a base address for the command table in memory and an offset for the tagged command list is recorded in a command header stored in a command queue.

In processing block 315 process 301 waits for the requested transfers to complete, and upon completion processing proceeds to processing block 317. In processing block 317 a single interrupt is received corresponding to completion of the single command requesting that the storage device transfer the list of multiple non-continuous address ranges. Then in processing block 319 that single interrupt is serviced.

It will be appreciated that additional details for requesting storage device transfers in accordance with a particular host controller interface may be found in the corresponding published specifications for that particular host controller interface (e.g. "Serial ATA Advanced Host Controller Interface (AHCI) 1.3," or "Serial ATA International Organization: Serial ATA Revision 2.6," or "Non-Volatile Memory Host Controller Interface (NVMHCI) 1.0" available on the worldwide web from Intel Corporation).

Figure 4A:
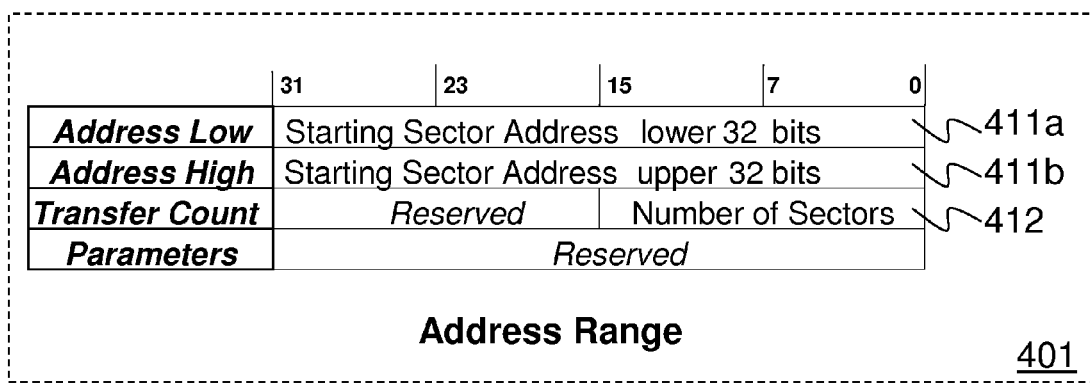
FIG. 4a illustrates an embodiment of a data structure for specifying an address range for a storage device transfer.

FIG. 4a illustrates an embodiment of a data structure comprising a sequence of 32-bit fields for specifying and address range 401 for a storage device transfer. Address range 401 includes an LBA or starting sector address 411a and 411b, and a quantity of data sectors 412 to transfer. Address range 401 may be recorded in a tagged command list as described in processing block 312. It will be appreciated that such tagged command lists may represent a sort of scatter/gather list. Were a typical scatter/gather list may be used to go to/from physical addresses from/to virtual addresses, the tagged command lists combine multiple reads or multiple writes with a scattered logical address map into one command, such as command 403, 404 or 408 described below.

Figure 4B:
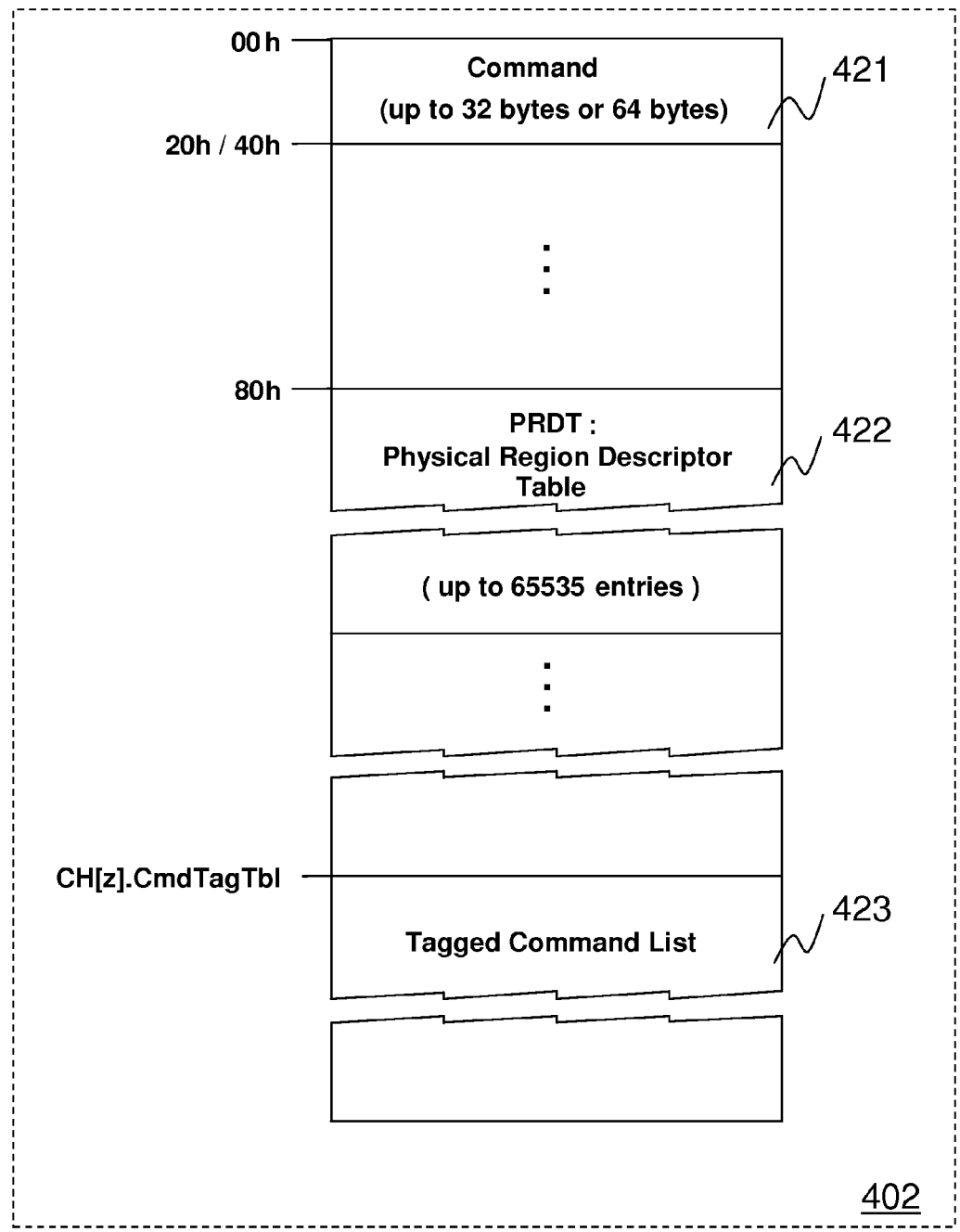
FIG. 4b illustrates an embodiment of a command table data structure including a tagged-transfer command and tagged command list of non-contiguous address ranges.

FIG. 4b illustrates an embodiment of a command table data structure 402 including a tagged-transfer command 421, which may be of a suitable length (e.g. up to 32 or 64 bytes) and also including a tagged command list 423 of non-contiguous address ranges (e.g. similar to address range 401). It will be appreciated that command table data structure 402 may also include other data sections and/or tables such as physical region descriptor (PRD) table 422, metadata, PRD indices, etc. as defined by the host controller interface. Command table data structure 402 may be stored in memory (e.g. system memory 115) in accordance with processing block 313.

Figure 4C:
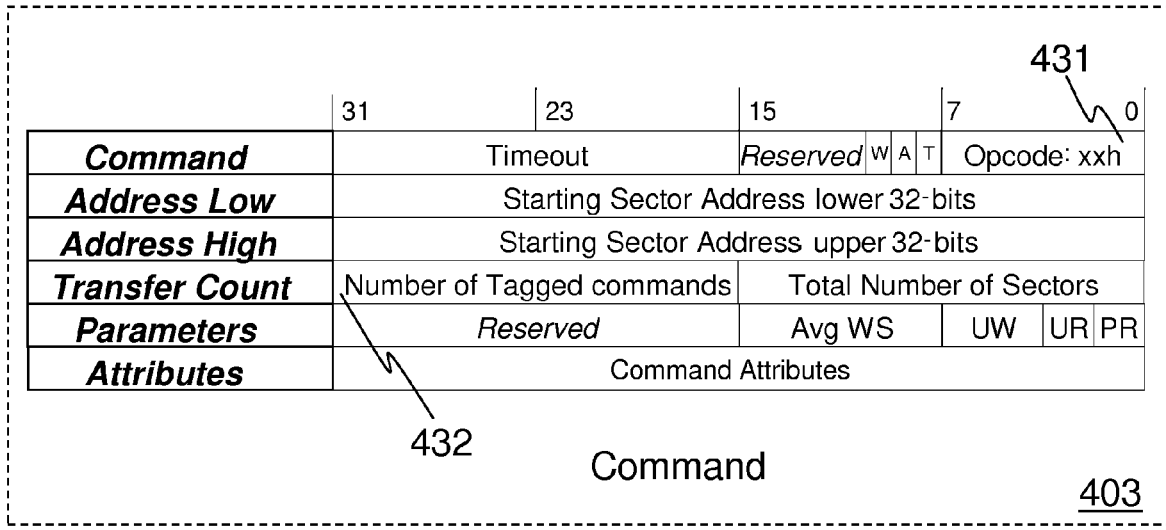
FIG. 4c illustrates an embodiment of a data structure for specifying a storage device tagged-transfer command.

FIG. 4c illustrates an embodiment of a data structure comprising a sequence of 32-bit fields for specifying storage device tagged-transfer command 403, which includes a count 432 of the number of non-contiguous address ranges in the tagged command list, and a tagged-transfer opcode 431. The tagged-transfer command 403 may be stored in a command table (e.g. command table data structure 402) in accordance with processing block 313. It will be appreciated that various tagged-transfer opcodes 431 may be used for reads or for writes, and that command 403 may also include other fields storing address data, parameters, attributes, etc., as specified by host controller interfaces such as AHCI and/or NVMHCI, or by a bus interface such as SATA.

Figure 4D:
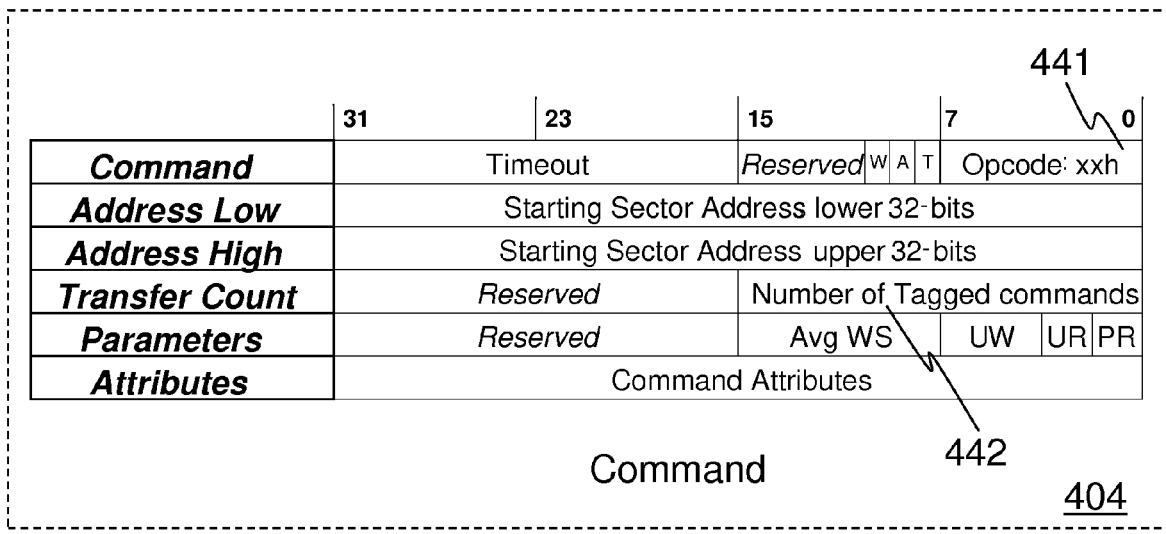
FIG. 4d illustrates an alternative embodiment of a data structure for specifying a storage device tagged-transfer command.

FIG. 4d illustrates an alternative embodiment of a data structure comprising a sequence of 32-bit fields for specifying storage device tagged-transfer command 404, which includes a count 442 of the number of non-contiguous address ranges in the tagged command list, and a tagged-transfer opcode 441. In embodiments of command 404, count 442 of the number of non-contiguous address ranges in the tagged command list, may replace a previously specified field (e.g. for a total number of sectors) of an existing host controller interface.

Figure 4E:
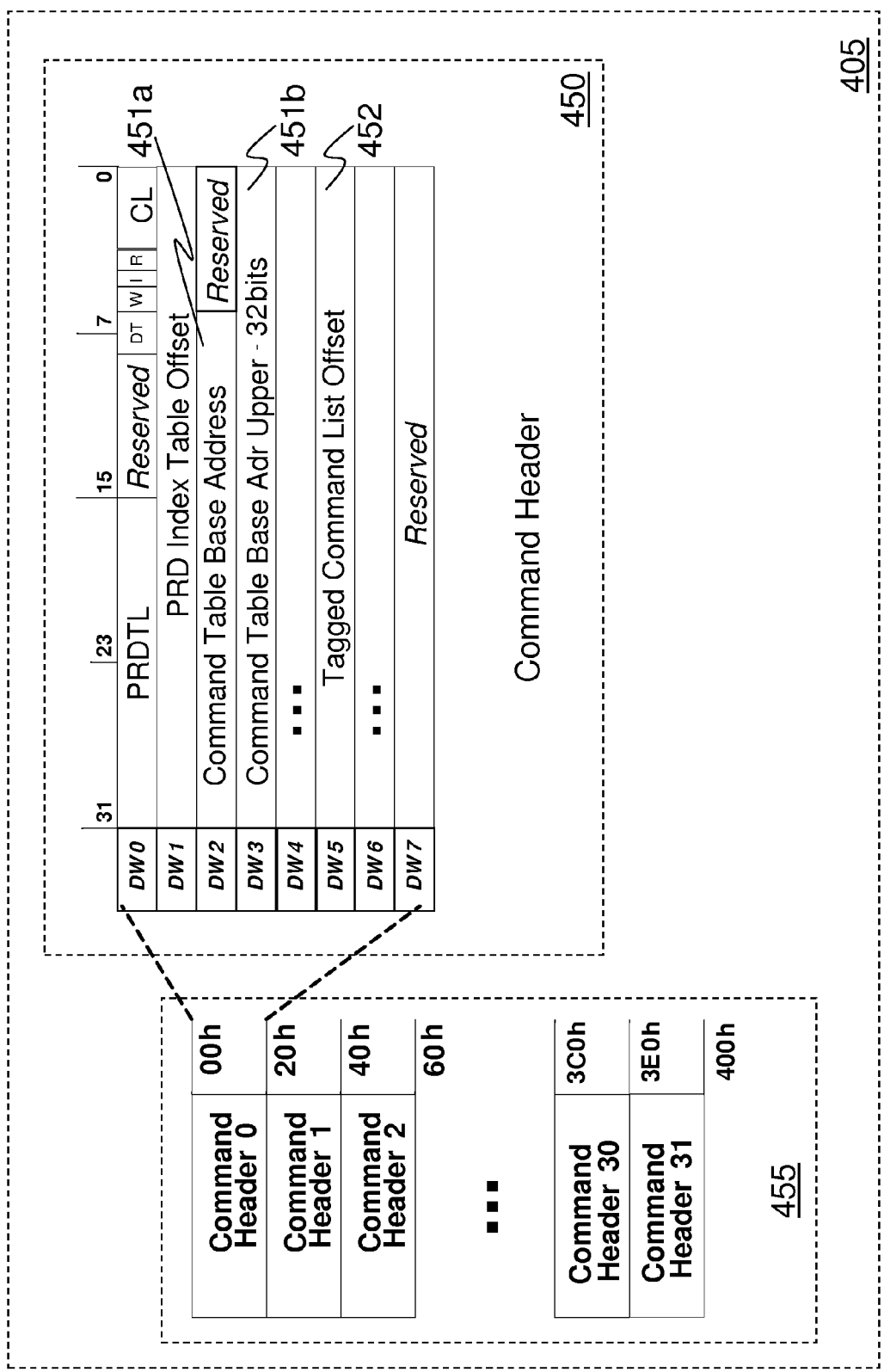
FIG. 4e illustrates an embodiment of a data structure for specifying a storage device command header including a base address for a command table in memory and an offset for a tagged command list of non-contiguous address ranges.

FIG. 4e illustrates an embodiment of a data structure 405 for specifying a storage device command header 450 comprising a sequence of 32-bit fields including a base address 451a and 451b for a command table (e.g. command table data structure 402) in memory (e.g. system memory 115) and an offset 452 for a tagged command list (e.g. tagged command list 423) of non-contiguous address ranges (e.g. address range 401). Command header 450 may be stored in memory in accordance with processing block 314.

Figure 4F:
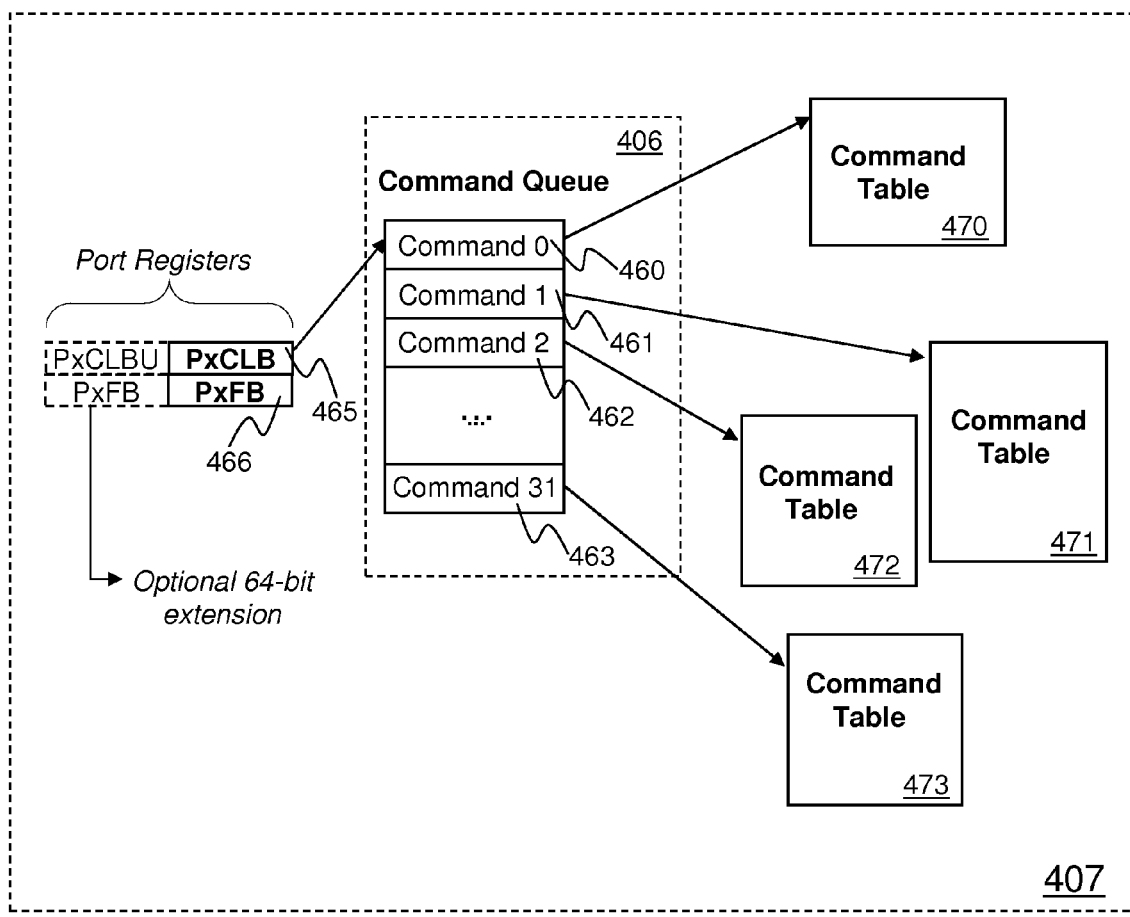
FIG. 4f illustrates an embodiment of a data structure for specifying a storage device command queue including multiple command headers.

FIG. 4f illustrates an embodiment of a data structure 407 for specifying a storage device command queue 406 including multiple command headers 460-463 (e.g. command header 450), identifying corresponding command tables 470-473 (e.g. command table data structure 402) and may be stored in accordance with processing block 314. A base address in memory (e.g. system memory 115) for command queue 406 may be identified for the storage device through port register 465. An additional base address in memory may also be identified through port register 466.

Figure 4G:
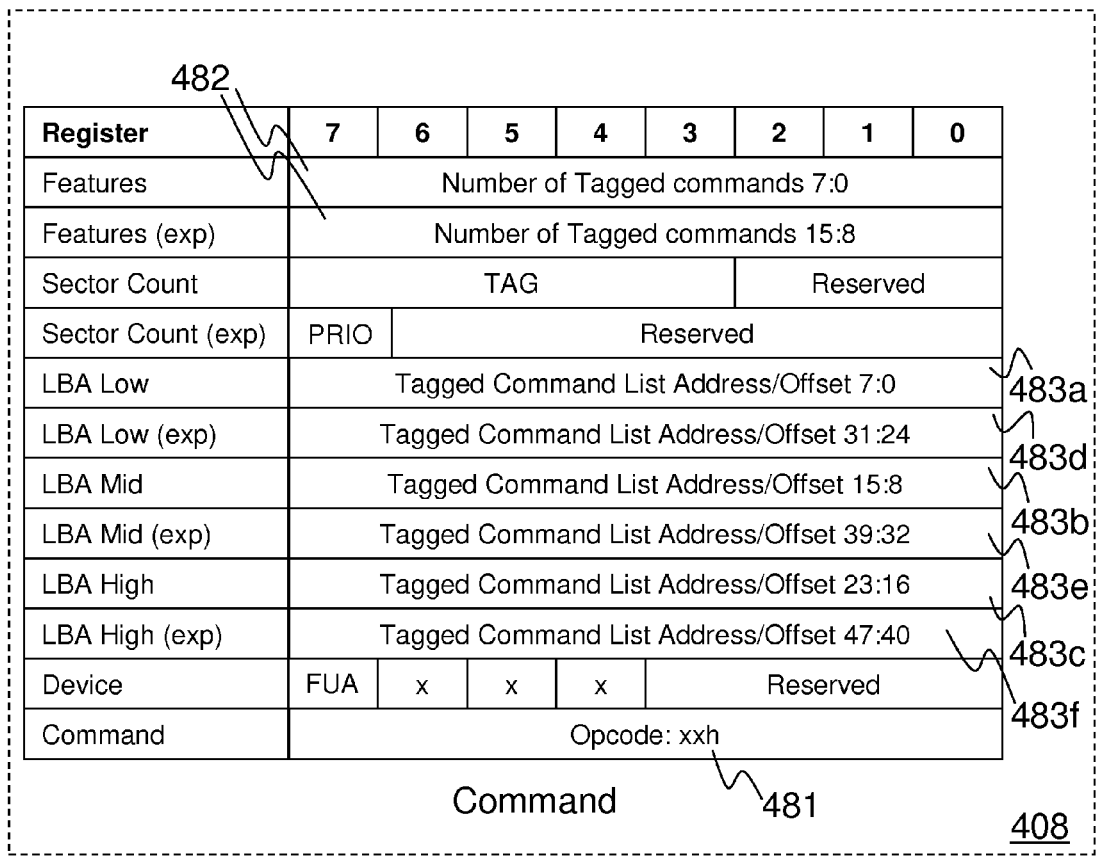
FIG. 4g illustrates an alternative embodiment of a data structure for specifying a storage device tagged-transfer command.

FIG. 4g illustrates an alternative embodiment of a data structure comprising a sequence of 8-bit registers for specifying a packet for a storage device tagged-transfer command 408, which includes a count 482 of the number of non-contiguous address ranges in the tagged command list, and a tagged-transfer opcode 481. In some embodiments of command 408, a tagged command list address/offset 483a-c or 483a-f (e.g. according to a defined PRD or Command Table) may be specified for DMA, in place of a linear block address (LBA) of an existing bus interface (e.g. like SATA ATAPI and/or SATA NCQ).

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

What is claimed is:

1. A method comprising:
sending a single Advanced Host Controller Interface (AHCI) or a Non-Volatile Memory Host Controller Interface (NVMHCI) command over a bus interface to a storage device, the single command comprising a plurality of command headers, wherein at least one of said command headers is to request the storage device to transfer a plurality of non-contiguous address ranges and includes a reference to the location of a tagged command list in which said plurality of non-contiguous address ranges is stored, said single command and said tagged command list being stored in a command table of a storage device; and
receiving a single system interrupt upon completion of the AHCI or NVMHCI command.

2. The method of claim 1 wherein said bus interface is a Serial ATA (Advanced Technology Attachment) bus interface.

3. The method of claim 1 wherein said single command has an Advanced Host Controller Interface (AHCI) data structure.

4. The method of claim 3 wherein said bus interface is a Serial ATA (Advanced Technology Attachment) bus interface.

5. The method of claim 1 wherein said single command has is a Non-Volatile Memory Host Controller Interface (NVMHCI) data structure.

6. The method of claim 1, further comprising:
recording, in said tagged command list, a starting address and quantity of data to transfer for each of said plurality of non-contiguous address ranges;

recording, in said single command, a tagged transfer opcode and a count of the number of said plurality of non-contiguous address ranges recorded in said tagged command list; and recording, in a command header, a base address for said command table in memory and an offset for said tagged command list, said command header being one of a plurality of command headers stored in a command queue.

7. The method of claim 6, wherein said bus interface is a Serial ATA (Advanced Technology Attachment) bus interface, the method further comprising:

producing a command packet for said Serial ATA bus interface from at least recorded base address, the offset for the tagged command list, and from the recorded count of the number of said non-contiguous address ranges.

8. The method of claim 6 wherein said command queue is for an Advanced Host Controller Interface (AHCI).

9. The method of claim 6 wherein said command queue is for a Non-Volatile Memory Host Controller Interface (NVMHCI).

10. An article of manufacture including a non-transient machine readable medium, said non-transient machine readable medium storing state and/or executable data, which when executed by one or more machines causes said one or more machines to:

collect a plurality of non-contiguous address ranges from a corresponding plurality of transfer requests;

record, in a tagged command list, a starting address and a quantity of data to transfer for each of said plurality of non-contiguous address ranges;

record, in a single Advanced Host Controller Interface (AHCI) or a Non-Volatile Memory Host Controller Interface (NVMHCI) command having a plurality of command headers, a tag transfer opcode and a count of the number of said plurality of non-contiguous address ranges recorded in said tagged command list, said single AHCI or NVMHCI command and said tagged command list being stored in a command table in a memory;

record, in at least one of said plurality of command header§., a base address for said command table in memory and an offset for said tagged command list;

send said single AHCI or NVMHCI command over a bus interface to a storage device to request the storage device to transfer said plurality of non-contiguous address ranges; and receive a single system interrupt upon completion of the AHCI or NVMHCI command.

11. The article of manufacture of claim 10, wherein said bus interface is a Serial ATA (Advanced Technology Attachment) bus interface.

12. The article of manufacture of claim 10 wherein said command queue is for an Advanced Host Controller Interface (AHCI).

13. The article of manufacture of claim 10 wherein said command queue is for a Non-Volatile Memory Host Controller Interface (NVMHCI).

14. A system for requesting transfer of a plurality of non-contiguous address ranges with a single command, the system comprising:

one or more system processors;

a system memory to store data and executable software;

a storage device coupled with the system memory to receive transfer commands stored in the system memory; and a processor executable host controller interface driver stored in the system memory that when executed by the one or more system processors causes said one or more system processors to:

collect a plurality of non-contiguous address ranges from a corresponding plurality of storage-device transfer requests;

record, in a tagged command list, a starting address and quantity of data to transfer for each of the plurality of non-contiguous address ranges;

record, in a single Advanced Host Controller Interface (AHCI) or a Non-Volatile Memory Host Controller Interface (NVMHCI) command having a plurality of command headers, a tagged-transfer opcode and a count of the number of non-contiguous address ranges recorded in the tagged command list, said single AHCI or NVMHCI command and said tagged command list being stored in a command table in the system memory for said storage device; and record, in at least one of said plurality of command headers, a base address for said command table and an offset for said tagged command list;

send said single AHCI or NVMHCI command over a bus interface to a storage device to request the storage device to transfer said plurality of non-contiguous address ranges; and receive a single system interrupt upon completion of the AHCI or NVMHCI command.

15. The system of claim 14 wherein said single command has an Advanced Host Controller Interface (AHCI) data structure.

16. The system of claim 14, wherein said bus interface is a Serial ATA (Advanced Technology Attachment) bus interface.

17. The system of claim 14 wherein said single command has a Non-Volatile Memory Host Controller Interface (NVMHCI) data structure.

* * * * *